United States Patent [19]

Terpay

[11] 4,404,243

[45] * Sep. 13, 1983

[54] LATENT PRESSURE-SENSITIVE SHEET MATERIAL AND METHOD OF MAKING SAME USING SOLVENT-BASED PRESSURE-SENSITIVE ADHESIVE

[75] Inventor: John M. Terpay, Danville, Va.

[73] Assignee: Reeves Bros., Inc., Spartanburg, S.C.

[*] Notice: The portion of the term of this patent subsequent to Aug. 4, 1998, has been disclaimed.

[21] Appl. No.: 404,766

[22] Filed: Aug. 3, 1982

[51] Int. Cl.³ .............................................. E04B 2/00
[52] U.S. Cl. ...................................... 428/62; 156/71; 156/72; 428/86; 428/90; 428/96; 428/97; 428/354; 428/355
[58] Field of Search ...................... 428/62, 86, 90, 96, 428/97, 354, 355; 156/71, 72

[56] References Cited

U.S. PATENT DOCUMENTS 4,282,051 8/1981 Terpay .................................. 428/90

Primary Examiner—Marion McCamish
Attorney, Agent, or Firm—Fisher, Christen & Sabol

[57] ABSTRACT

A latent pressure-sensitive sheet material, e.g., fastener or closure having a discontinuous surface is made by applying a solvent-based pressure-sensitive adhesive by means of a gravure roll onto a flocked pile surface which is adhered to a substrate by a permanent adhesive. The flocked pile surface serves as a reservoir for the pressure-sensitive adhesive. The pressure-sensitive adhesive is wicked towards the face of the flocked pile surface upon face-to-face mating of two fasteners. The reservoir of pressure-sensitive adhesive and the wicking action enables repeated fastening and unfastening of two mated fasteners without substantial loss of locking power. The fasteners are particularly useful for seaming carpets. Also, the reservoir of pressure-sensitive material in one said fastener can be a curable or crosslinkable pressure-sensitive adhesive material, e.g., epoxy resin, and the pressure-sensitive material in the other said fastener can be a pressure-sensitive adhesive curing or crosslinking substance reactive with said curable pressure-sensitive adhesive material to cure or crosslink same, e.g., a polyamide curing agent for said epoxy.

30 Claims, 3 Drawing Figures

LATENT PRESSURE-SENSITIVE SHEET MATERIAL AND METHOD OF MAKING SAME USING SOLVENT-BASED PRESSURE-SENSITIVE ADHESIVE

BACKGROUND OF THE INVENTION

1. Field of the Invention

This invention relates to a pressure-sensitive fastener which can be repeatedly fastened and unfastened, without significant loss of locking power and to a method of making same. The invention relates to an alternative method to that described in my U.S. Pat. No. 4,282,051 and provides a relatively safer method for applying solvent-based pressure-sensitive adhesives.

2. Description of the Prior Art

The seaming of carpets by sewing the two pieces together is well known. The method however, is labor-intensive and rather time-consuming. Also known in the art for the seaming of carpets are heat-sensitive polymer-containing tapes. The two pieces of carpet are butted together, the heat-sensitive tape is applied in the lengthwise direction of the seam so as to overlap the two pieces of carpet and then heat is applied to the tape by means of an iron or the like. The polymeric component of the tape melts and infuses into the carpet backing. Upon cooling, the polymeric component hardens and adheres to the carpet. However, the need to heat the tape presents the risk of over-heating and damaging the carpet. Moreover, in both the sewing and heat-sensitive tape methods, the correction of errors due to misalignment of the edges of the carpet to be seamed would require considerable time in both undoing the seamed portion and in redoing of the seam.

Similar problems in correcting misalignment errors are encountered in the conventional methods for the laying of carpets. Conventionally, carpet is laid by tacking the carpet perimeter to a wood strip by means of staples, nails, or the like or to a metal strip having prong-like elements attached thereto. Once tacking of a carpet has begun by these methods, unfastening of the carpet to correct errors is difficult and often results in damage to the carpet. Another means for the laying of carpet is carpet tape having a pressure-sensitive adhesive on both sides of the tape. However, these conventional pressure-sensitive adhesive tapes suffer a severe loss of adhering ability when separated from the floor or carpet to correct an error.

According to the present invention, there is provided a pressure-sensitive fastener which can be repeatedly fastened and unfastened without substantial loss of locking, or holding power. It is eminently suitable for the seaming and laying of soft and hard surface flooring because either task can be accomplished quickly and moreover misalignment errors can be readily corrected. It is also well suited for use in joining two pieces or parts of clothing as in closing diapers, sweaters, slacks, blouses, etc. The pressure-sensitive fastener of this invention is superior to prior art devices such as Velcro and does not catch into looped or pile fabrics, e.g., sweaters, rugs and the like as Velcro does with consequent destructive or damaging effect on the fabric.

The fastener of this invention is well suited for use as closures on hospital garments such as disposable examination gowns and other disposable garments, disposable hats and caps for cooks, waitresses, waiters and the like, disposable aprons, disposable bibs for lobster eaters and babies, disposable coveralls and disposable laboratory coats. My novel fasteners are useful in many other applications including the packaging field in which my fasteners can be used for closing sandwich bags, cereal packages, cartons of sugar, bags of foods such as bags of potato chips and other snack products, freezer pouches, refrigerator pouches, tea boxes, cartons for other dry products, closures for dog food bags and cat food bags, closures for shopping bags, closures for garment bags, closures for garbage bags, cracker boxes, cookie boxes, candy boxes, candy wrappers, and candy bags. Furthermore, the fasteners of this invention can be used as belts for holding disposable mattresses, attachment devices for attaching polishing felts to the polishing wheel, attachment devices for attaching storm windows to the interior of permanent windows, attachment devices for attaching screens to windows or doors, closure devices for braces, trusses and other medical devices, holding devices for bandages such as ace bandages or other wrap-around type bandages, closure devices for medical rescue blankets and the like. In the medical field the fastener of my invention can be used as a rib, back and stomach support girdle made in a piece of about six inches to ten inches width designed to encircle the midriff and fasten to itself at the desired girth. It can also be used to cover the limbs or other parts of the body before application of casts such as plaster of paris. It can also be used as a substitute or adhesive tape, for example, in holding down patients during movement or during surgical operations. In addition, it can be used as hold-down straps for hospital patient transportation carts. In addition, latent pressure-sensitive sheet material of this invention can be used as a closure for storage boxes which can be opened and closed repeatedly. The novel sheet material of this invention can be used also as a waistband material for attachment to trousers, slacks, pants, shorts, etc. and to blouses, shirts, sweaters, etc. so that the former can be removably attached to the latter with the result that a shirt will stay within trousers, for example, without coming out. The novel latent pressure-sensitive sheet material can also be used for the purpose of picking up fine material such as lint off of clothing, dust off of furniture, walls, floors and other surfaces, disposable lint mats or door mats, disposable dusting devices, for example, in the form of a roll, portions of which can be removed when they become laden with dirt or particles and the like. The novel sheet materials can be used as anti-slip devices, for example, on clothes hangers for trousers or slacks to prevent them from slipping off. In addition, especially in connection with the sheet material made from paper as the base material, the novel sheet materials can be printed with a garment pattern so that garments fabrics can be laid down and cut out from the pattern without slipping of the fabric on the pattern. In this instance the latent pressure-sensitive sheet material adheres to the fabric sufficiently to prevent slippage of the fabric on its surface. The paper based sheet material can be used in the graphic arts fields, in the manufacture of toys such as paper dolls, display boards for children, bulletin boards, etc. The materials of my invention can also be used as covers for sports goods, for example, covers for the handles of golf clubs, baseball bats or tennis rackets, oars, paddles and the like. The novel fastener can also be used as a closure means for covers for the heads of golf clubs, and can be used as closures for pocket flaps in luggage or golf bags. Additionally, the fasteners can be used for holding slipcovers on furniture, for holding other soil shields on furniture and on a wide variety of household products. As can be well appreciated, the novel fasteners have a very wide range of use.

SUMMARY OF THE INVENTION

The present invention relates to a latent pressure-sensitive sheet material, the latent fastening ability of which depends upon the face-to-face mating of two pile surfaces. The face-to-face pile surface has both a mechanical and a chemical fastening ability. The novel sheet material comprises a flocked pile surface adhered to a base material by a permanent adhesive, and a reservoir of solvent-deposited pressure-sensitive adhesive adhering to and between the fibers forming the flocked pile surface. Mechanical fastening ability is provided by the intermeshing of the fibers forming the flocked pile surface. Chemical fastening ability is provided by the pressure-sensitive adhesive. The flocked pile surface greatly increases the surface area for holding pressure-sensitive adhesive over the surface area of conventional, flat, pressure-sensitive adhesive tapes. The pressure-sensitive adhesive is absorbed into the fibers of the flocked pile surface and is also retained between the fibers. The pile surface therefore functions as a reservoir and as a wick for the pressure-sensitive adhesive. The face-to-face mating of the pile surface draws on the stored supply of adhesive. The face of the pile surface is mildly tacky to the hand. However, when mated face-to-face it adheres with great shear strength. The mated fasteners can be peeled apart repeatedly and reused without losing their adhering ability as opposed to a conventional pressure-sensitive tape. The pressure-sensitive adhesive is applied to the flocked pile surface so as not to form a continuous, substantially flat film of pressure-sensitive adhesive on the tips of the flocked pile fibers. The fastener must have a discontinuous surface so as to increase the surface area available for mating. The surface of the novel pressure-sensitive fastener of this invention generally resembles a surface having a large proportion of vertical or sloped portions as compared to a small amount of horizontal portions.

To obtain the desired discontinuous surface, the quantity of pressure-sensitive adhesive applied to and between the fibers of the flocked pile surface must be limited so that it coats the fibers and provides a reservoir between the inner end portions of the fibers. Doctoring on the pressure-sensitive adhesive, for example with a smooth roller can flatten the fibers and result in a substantially continuous surface. According to the present invention, a base material is coated with a permanent adhesive. Then, the permanent adhesive-coated base material is flocked with pile fibers and the permanent adhesive is cured by heating to secure the pile fibers to the base material. The solvent-based pressure-sensitive adhesive is then applied to the cured flock-coated base material by use of a gravure roll. An amount is applied which does not totally flood the spaces between the fibers and which does not form a generally continuous film on the flocked pile surface. A series of gravure rolls can be used to apply a sufficient amount of pressure-sensitive adhesive. The cured flock material is then dried and wound onto a roll.

The novel pressure-sensitive fasteners of the present invention are of particular utility for seaming and laying of soft and hard floor coverings such as carpets and has special utility in the wearing apparel fields, the packaging fields and, in general, in the closure fields and fastener fields.

BRIEF DESCRIPTION OF THE DRAWINGS

The invention is illustrated in the accompanying drawings wherein.

DETAILED DESCRIPTION OF THE INVENTION

Figure 1:
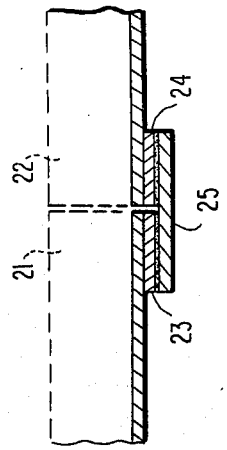
FIG. 1 shows the cross-section of a magnified pressure-sensitive fastener according to the present invention.

The pressure-sensitive fasteners of the present invention have a discontinuous surface as illustrated in FIG. 1. The pressure-sensitive fastener comprises a base material or substrate 1 which is coated with a permanent adhesive 2. Flock fibers 3 are adhered to the base material 1 by means of the permanent adhesive 2. Adhering to and between the fibers 3 forming the flocked pile surface is a reservoir of solvent deposited pressure-sensitive adhesive 4.

By permanent adhesive is meant an adhesive which has sufficient adhesive strengh to bond the flocked fibers 3 to the base material 1 under conditions which would be required to separate face-to-face mated fasteners. Suitable permanent adhesives are well-known in the art and do not form a part of the present invention. Adhesives known in the art as laminating adhesives and flocking adhesives are conventional adhesives which can be used in the practice of the present invention. The flocking adhesives include crosslinkable or self-crosslinking acrylic dispersion adhesives, polyvinylchloride plastisols, polyurethane systems, and solvent-based acrylic solutions. The preferred adhesives for use as the permanent adhesive 2 used in the fasteners of the present invention are aqueous dispersed self-crosslinking acrylic adhesives. Exemplary of the latter type of acrylic adhesives are Rhoplex HA-8; Rhoplex HA-24, Rhoplex E 32; Rhoplex E 358; Rhoplex E 269, and Rhoplex HA-12, all manufactured by Rohm & Haas. Other suitable adhesives are Plextol DV240, Plextol DV300, Plextol DV475 and Plextol DV410, all manufactured by Röhm GmbH. All of these adhesives as well as numerous other suitable adhesives for adhering the flocked pile fibers 3 to the base material 1 are disclosed in *Handbook of Adhesives,* 2nd edition, Skeist, Irving, editor, Van Nostrand Reinhold Company, publishers, pages 535 to 539 and 542 to 546 (1962). The cited portions of the *Handbook of Adhesives* are herein incorporated by reference in their entirety.

A pressure-sensitive adhesive is an adhesive which forms a permanently tacky film after the evaporation of the liquid phase or after cooling of a hot melt and usually comprises an elastomer resin, a solvent and a resin tackifier. Pressure-sensitive adhesives adhere tenaciously upon application with only light finger pressure. Various polymeric raw materials are used in the formulation of pressure-sensitive adhesives. Exemplary of the polymers used are natural rubber, polyisobutylene, polyvinyl ether, various types of synthetic rubber (such as styrene-butadiene copolymers), ethylene copolymers, vinyl polymers (such as polyvinylacetate, polyvinylalcohol, and acrylics), and polyurethanes. The preferred pressure-sensitive adhesives for use in the present invention are solvent-based systems. However, aqueous pressure-sensitive adhesives or hot melt pressure-sensitive adhesives can be applied with gravure rolls pursuant to this invention.

The solvent-based pressure-sensitive adhesives which are suitable for the purposes of the present invention are commercially available and do not form a part of the present invention. Pressure-sensitive adhesives normally are composed of a rubbery type elastomeric resin combined with a liquid or solid resin tackifier component. If desired, a mixture of resins may be used to provide a balance of properties which cannot be otherwise attained with either resin alone. Fillers are also often added to adjust the rheological properties or add color. In addition, anti-oxidants are usually used to stabilize the adhesive against oxidation. The preferred solvent-based pressure-sensitive adhesives are solvent solutions of vinyl polymers such as the acrylics or polyvinylacetate. The vinyl polymers may be highly plasticized to obtain the desired tackiness for a pressure-sensitive adhesive. The acrylic pressure-sensitive adhesives have excellent properties, such as aging resistance, light stability, good adhesion to various types of substances, and ease of application. The acrylics typically contain acrylic esters with four or more carbon atoms in the alcohol component. The desired tack of these pressure-sensitive adhesives is attained primarily with N-butyl acrylate and/or 2-ethylhexyl acrylate. The conventional acrylate pressure-sensitive adhesives are normally copolymers of the higher alkyl acrylates with a small amount of a polar comonomer such as acrylic acid, acrylamide, maleic anhydride, diacetone acrylamide, and long chain alkyl acrylamides.

Suitable solvents include the aromatic hydrocarbons such as toluene, ethyl acetate, methyl ethyl ketone, dimethylsulfoxide, hexane, isopropanol or mixture thereof, n-heptane, methylene chloride, cyclohexane, acetone, petroleum solvent, isopropyl acetate or mixtures thereof.

Suitable, commercially available, solvent-based acrylic pressure-sensitive adhesives include AMSCO-9105 sold by Union Chemical Co., div. of Union 66 Inc and is a solvent-based acrylic polymer in a solvent of oxygenated hydrocarbon blends, PSA-9106 sold by Union Chemical which is a solvent-based acrylic polymer in ethyl acetate as solvent, Soluron AR 1060 made by Protex, of France, Solution RA 737, 784, 788, 858, 1040, 1151, 1159, 1706 and 1753, and Solution 263, all products of Monsanto Chemical Co., Hycar 2100×22, ×26, ×29 and ×33, a product of Goodrich, the various Solucryl solution products manufactured and sold by UCB s.a., e.g., numbers 3067, 347, 3068, 376, 355, 154, 145, 180 or S.

Other rubbery or elastomeric materials can be used rather than the acrylics described above. For example, as the elastomeric component of the pressure-sensitive adhesive there can be used milled natural rubber, reclaimed rubber, SBR rubber, butyl rubber (polyisobutylene), butadiene acrylonitrile rubber (Buna-N), polyvinyl ethers, polyacrylate esters, styrene-butadiene-styrene block copolymers, styrene-isoprene styrene block copolymers and the like. Suitable tackifiers include polyterpene resins, gum rosin, rosin esters, and other rosin derivatives, oil-soluble phenolic resins, coumarone-indene resins, petroleum hydrocarbon resins and the like. Suitable plasticizers include mineral oil, liquid polybutenes, liquid polyacrylates, lanolin and the like. Suitable fillers include zinc oxide, titanium dioxide, aluminum hydrate, calcium carbonate, clay, pigments and the like. Suitable antioxidants include the rubber antioxidants, the metal dithiocarbamates, metal chelating agents and the like.

Furthermore, the pressure-sensitive adhesive employed herein can contain a minor amount of a heat curing resin which can crosslink upon the application of a moderate level of heat. For example, a rubber-based pressure-sensitive adhesive can be modified with a heat-curing, oil-soluble phenolic resin to which an alkaline filler or zinc resinate is added as a catalyst to promote the reaction between the phenolic resin and the rubber of the pressure-sensitive adhesive.

In addition, the present invention provides a system of pressure-sensitive fasteners made in the manner described herein and comprising first and second flocked pile surfaces adhered to respectively first and second base material by a permanent adhesive. In the first such pressure-sensitive fastener there is present a reservoir of curable, e.g., epoxy, pressure-sensitive adhesive material adhering to and between the fibers of the first flocked pile surface. The second pressure-sensitive fastener contains a reservoir of pressure-sensitive adhesive curing material adhering to and between the fibers of the second flocked pile surface. The curing material is reactive with the curable, e.g., epoxy, pressure-sensitive material to form a crosslinked structure of both the epoxy and the curing material when the first and second pressure-sensitive fasteners are brought together in face-to-face contact. There are available commercially systems of this type which can cure over a period of time, e.g. 1 to 70 hours or more, at ambient temperatures. A suitable epoxy pressure-sensitive adhesive material is a polybutadiene epoxide such as Hycar 1300×8. Another suitable curable pressure-sensitive adhesive material is an epoxy resin made from diglycidyl ether and bisphenol A such as that sold by Wilmington Chemical Co., under the name Heloxy X-598. In general, any modified Class I epoxy composition can be employed. The pressure-sensitive adhesive curing material can be a polyamide, a polycarboxy material, a polycarboxylic acid anhydride material or any other material that is reactive with the epoxy pressure-sensitive adhesive material to form a crosslinked structure. A suitable polyamide resin is Ancamide 220 made and sold by Pacific Anchor Chemical Co. Reference is made to "Epoxy Resin Technology" Edit. by Paul F. Bruins, published 1968, Interscience Publisher, New York, N.Y., for descriptions of suitable epoxy compositions and curing materials for use in this invention. The pertinent parts of this textbook are incorporated by reference.

All of the above-mentioned pressure-sensitive adhesives as well as other acrylic pressure-sensitive adhesive compositions which can be used in the present invention are disclosed in the Handbook of Adhesives, supra, at pages 535–539 and 726–728, which are herein incorporated by reference with regard to said compositions.

In some instances the pressure-sensitive adhesive may be applied as a hot melt rather than a solvent-based solution of the pressure-sensitive adhesive in an organic solvent. Such hot melt pressure-sensitive adhesives are well known and are disclosed in the above-identified *Handbook of Adhesives.* Furthermore, aqueous dispersed pressure-sensitive adhesives as described in my U.S. Pat. No. 4,282,051 or in the above-identified *Handbook of Adhesives* can be applied to the pile surface according to this invention utilizing gravure rolls thereby avoiding a spray-type application which may not be preferred.

The base material 1 can be a woven or a nonwoven material. Exemplary of the materials suitable for forming the base material 1 for use in the present invention are plastic films, e.g. polyethylene terephthalate film, cellulose film, etc., cotton scrim, polyester-cotton scrim, viscose rayon cloth, paper, and cotton cloth. In addition, non-woven materials such as spun-bonded nylon fabric, e.g., Cerex sold by Monsanto, spun-bonded polyester, e.g., Remay sold by duPont and other similar products including needle punched non-wovens, resin bonded non-wovens, etc. The latent pressure-sensitive sheet material of this invention furthermore can be made from paper as the substrate or base material. Knitted fabrics such as circular knitted fabrics or warp knitted fabrics, e.g. tricot fabrics can be used. In addition, stitch-bonded fabrics such as Malimo, Malipol, Maliwatt and the like can also be used. Weft insertion warp knit fabrics can also be used as the base material.

Suitable flocked pile fibers 3 are flocked viscose rayon fibers, acrylic flock, polypropylene flock, nylon flock, cotton flock, polyester flock and mixtures of any two or more thereof. The length of the flocked pile fibers can be between about 25 to about 160 thousandths of an inch, preferably about 80 to 100 thousandths of an inch. The thickness of the flocked pile fibers 3 should be between about 2 denier to about 100 denier, preferably about 6 denier to about 20 denier. If the fibers are too long or too short the locking power and the duration of the locking power of the fasteners would both decrease. The longer the fiber, the thicker it must be for it to stand up and as a result, the fiber concentration is reduced. The lower the fiber concentration, the less the locking power because the surface area for absorbing the pressure-sensitive adhesive is reduced. The shorter the fibers at any given fiber concentration, the less the surface available for coating by the adhesive and consequently the less the volume of the pressure-sensitive adhesive effectively maintained between the fibers. In other words, the depth of the reservoir of pressure-sensitive adhesive must decrease as the fiber length decreases so as to maintain the required discontinuous surface.

Figure 2:
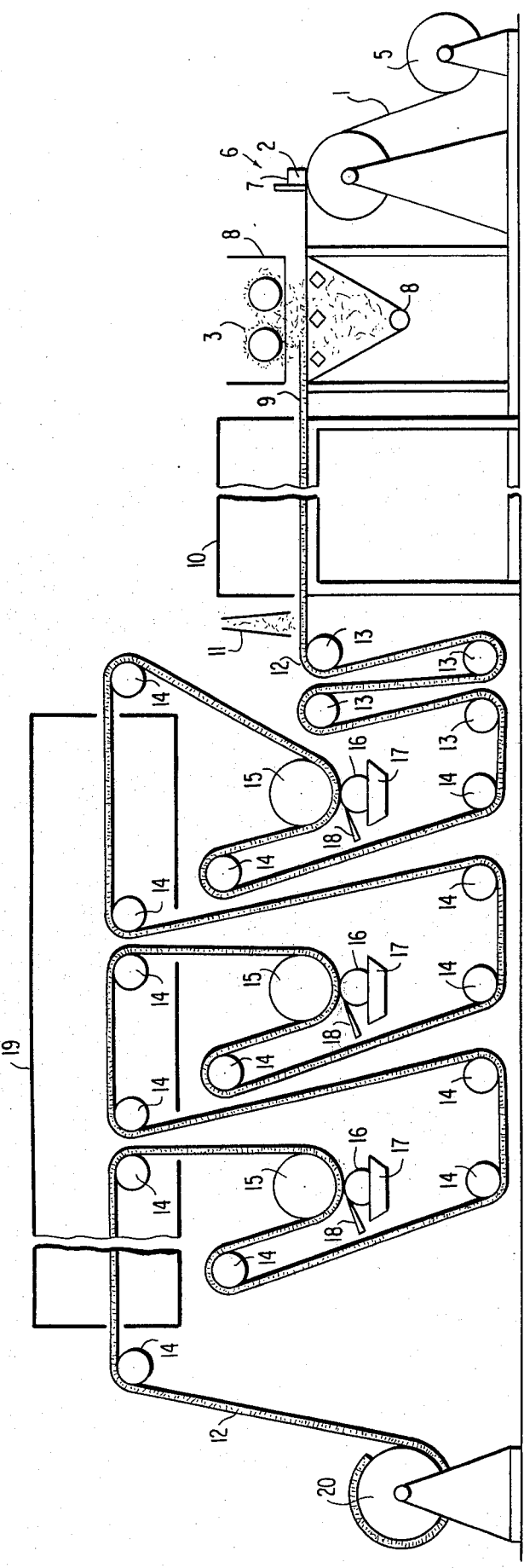
FIG. 2 schematically shows apparatus for producing the pressure-sensitive fastener according to the present invention.

A method for making a pressure-sensitive fastener having a discontinuous surface in accordance with the present invention is illustrated in FIG. 2. As shown in FIG. 2 base material or substrate 1 is continuously fed from substrate holder 5 to adhesive coater 6 wherein it is coated with the permanent adhesive 2 which is supplied from permanent adhesive holder 7. The permanent adhesive-coated base material is then passed to flock coater 8 wherein flock fibers 3 are flocked onto the adhesive-coated base material to produce a flocked pile surface 9. The flock coater 8 may be a mechanical and/or electrical flocking machine which is conventional in the art. The permanent adhesive is then heat cured in curing oven 10 to secure the pile fibers to the base material. Suitable curing temperatures and times depend upon the permanent adhesive used and are ascertainable from the manufacturer's directions for using the adhesive. Typical curing temperatures are between about 250° F. to 325° F. Typical curing times are between about 1 minute to about 4 minutes. The cured product is then passed to vacuum 11 for removal of residual loose fibers. The vacuumed pile sheet material 12 is then passed to accumulator rolls 13 from which it is passed around guide rolls 14 to rubber pressure roller 15 which presses the pile surface of the pile sheet material 12 into contact with gravure roll 16 which rotates with its lower portion in "ink" pan 17 which is filled with the solvent-based pressure-sensitive adhesive. The gravure roll 16 is formed with an irregular surface which preferably comprises a helical groove extending from one end to the other around the gravure roll. A helical groove roll such as this is made and sold by ABC Industries, Inc., 724 N. Interstate 85, Charlotte, N.C. 28230, as a "tri-helical cell engraving roll". Other shapes of engraving rolls can be used, for example the quadrangular cell engraving roll wherein the entire surface of the roll is formed with quadrangular protuberances such that there results a large multitude of grooves intersecting each other at 90° angles. Another type of engraving roll is the pyramid cell gravure roll which comprises a large multitude of tiny pyramids protruding from the surface of the roll such that there are a large multitude of V-shaped grooves intersecting each other at right angles. Any one of the above-mentioned three types of engraving rolls or gravure rolls can be used. They are all made and sold by ABC Industries, Inc. and others.

A doctor blade 18 scrapes excess solvent-based pressure-sensitive adhesive from the roll 16, that is, all except that which is in the grooves of the roll. Then the surface of the roll contacts the pile surface of the pile sheet material 12 to deposit the pressure-sensitive adhesive within the grooves of the roll into the pile structure of the pile sheet material, that is, the pressure-sensitive adhesive becomes a reservoir adhering to and between the fibers of the pile surface. The pile sheet material 12 to which the pressure-sensitive adhesive 4 has been applied by the gravure roll 16 is then passed into oven 19 in which the solvent is driven off. The oven 19 preferably operates at a temperature in the range of 200° F. to 350° F. for a period of time of 1 to 4 or 5 minutes total residence time in the oven.

As shown in FIG. 2 the pressure-sensitive adhesive is applied in three stages which essentially are the same depending on the depth of the reservoir of pressure-sensitive adhesive desired in the pile sheet material 12. One, two or three of the stages can be used. The total residence time in the oven in one, two or three stages, whatever number of stages is used, is typically 1 to 4 or 5 minutes. Higher or lower temperatures can be used in the oven 19 and longer or shorter residence times can be employed. After passing out of the oven the pile sheet material is wound on a take-up roll 20. The amount of pressure-sensitive adhesive applied to the flocked pile surface of sheet 12 should be enough to form a reservoir of pressure-sensitive adhesive 4 between the flocked fibers 3. However, the amount must not be so great as to flood the flocked pile surface all the way up to the top of the fibers thereof thus creating a relatively flat film of pressure-sensitive adhesive on the flocked pile surface. The flocked pile surface after application of the pressure-sensitive adhesive must be discontinuous or irregular so as to increase the surface area available for mating of two fasteners.

Figure 3:
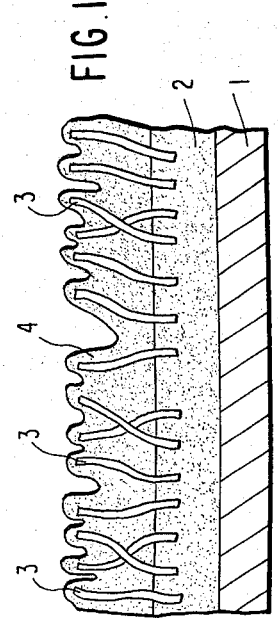
FIG. 3 shows two objects which have been joined together with the pressure-sensitive fastener of the present invention.

The joining of two objects, according to the present invention is illustrated in FIG. 3. As shown in FIG. 3, two objects 21 and 22 are joined together by applying two pieces of pressure-sensitive fasteners 23 and 24 to the bottom and along the edge of each object to be joined with, for example, a conventional building adhesive, discussed below. The flocked pile surface of a third piece pressure-sensitive fastener 25 is then bridged across and mated to the flocked pile surfaces of the other two pressure-sensitive fasteners 23 and 24.

The pressure-sensitive fastener of the present invention can be in the form of a tape or in the form of a roll of fabric several yards in width. To attach two objects together, the pressure-sensitive fastener of the present invention is applied to one of said objects. A second pressure-sensitive fastener is applied to the other object and the flocked pile surfaces of the two pressure-sensitive fasteners are then contacted with slight finger pressure to adhere the two objects together. In this manner the pressure-sensitive fasteners of the present invention can be used to lay soft and hard surface flooring. In the latter application a first pressure-sensitive fastener is applied to the back of the object to be laid, such as the back of a carpet. Next, a pressure-sensitive fastener is adhered to the floor by means of a permanent adhesive such as those discussed above or by means of a building adhesive such as those discussed in the *Handbook of Adhesives*, supra, pages 546 to 548 (which pages are herein incorporated by reference in their entirety as they relate to building adhesives). Once the floor is prepared with the pressure-sensitive fastener of the present invention, the pressure-sensitive fastener attached to the floor covering is contacted therewith. In like manner, the pressure-sensitive fasteners of the present invention can be used to hang wall coverings, and on inter-office envelopes. In the latter application, the paper forming the envelope can serve as the base material 1 of the pressure-sensitive fastener.

The pressure sensitive fasteners of the present invention can also be used without face-to-face mating with another pressure-sensitive fastener where high shear strength is not needed or where the material to be held is fibrous. Exemplary of such applications are attaching a pressure-sensitive fastener according to the present invention to a silk-screen table to prevent movement of solid fabric, towels, etc. during the printing process. Likewise, the pressure-sensitive fastener of the present invention can be attached to a roller for use as a lint brush, and as a means for removing dust.

The system of first and second pressure-sensitive fasteners in which the first fastener has a curable or crosslinkable pressure-sensitive adhesive reservoir adhering to and between the fibers of the first pile surface and the second fastener has a reservoir of a pressure-sensitive adhesive curing or crosslinking material can be used for joining pieces of carpets in the manner described above. For example, the first pressure-sensitive fastener is attached to the first of two objects to be joined and the second pressure-sensitive adhesive fastener is attached to the second object to be joined. Then the first and second pressure-sensitive adhesive fasteners are brought in face-to-face contact. After a period of time passes, the curable material is cured or crosslinked by or with the curing material to form a permanent bond. Another way of joining two objects is to attach a piece of the first (or second) pressure-sensitive adhesive fastener to the first and second objects followed by the face-to-face contact of the second (or first) pressure-sensitive adhesive fastener with the first fasteners attached to the first and second objects.

The above-described system of first and second pressure-sensitive adhesive fasteners is well suited for purposes of installing headliners in automobiles and other vehicles such as boats and airplanes. In this application the first (or second) pressure-sensitive adhesive fastener is attached to the ceiling or interior surface of the roof of the automobile and the second (or first) pressure-sensitive adhesive fastener is attached to the underside of the headlining material. The first and second fasteners are then brought into face-to-face contact as a headliner is put in place. The pressure-sensitive adhesive nature of the fasteners enables the applicator to remove the headliner and readjust its position in regard to the ceiling any number of times until the correct position is achieved. Thereafter the passage of several hours allows the first and second fasteners to cure or crosslink and thus form a relatively permanent structure.

The following example illustrates the method of making the pressure-sensitive fastener having a discontinuous surface according to the present invention.

EXAMPLE

A piece of polyester/nylon blend base fabric is knife-coated with Rhoplex E-32 (aqueous acrylic adhesive made by Rohm and Haas having a solids content of 46% and a viscosity of 200 cps) thickened with any conventional thickening agent to a viscosity of about 50,000 cps. Then nylon pile fibers are electrostatically flocked onto the substrate bearing the adhesive coating and are secured to the base fabric by heat curing the adhesive at about 300° F. for about 3 minutes. The cured, flock-coated material is then coated with a toluene solution of a synthetic butyl rubber (polyisobutylene) pressure-sensitive adhesive made by General Adhesives & Chemical Co., a division of Genesco, using a gravure roll which rotates in the solvent-based pressure-sensitive adhesive. A doctor blade is used to wipe the excess adhesive which is not present in the grooves of the roll. The thus coated fabric is then passed into an oven followed by application of more solvent-based pressure-sensitive adhesive, passage into an oven for the second time, application of additional solvent-based pressure-sensitive adhesive for the third time in the manner described above and passing the coated roll through an oven followed by winding it on a storage or shipment roll. The oven temperature is in the range of 200°–350° F. and total residence time in the oven, including all three passes through the oven, amounted to 2 or 3 minutes to dry the coated fabric, i.e. remove the toluene solvent. There resulted a pressure-sensitive fastener having a discontinuous surface according to the present invention. The pile fibers of the fastener produced by this example were not compacted or compressed against the surface of the base fabric but stood upwardly from the surface of the base fabric, thus illustrating the important advantage of the present invention, namely, the gravure rolls promote application of the pressure-sensitive adhesive to the pile surface without compressing or compacting the pile fibers down against the surface of the base fabric.

It is also possible to apply a pile surface on both surfaces of the base fabric and to provide a reservoir of pressure-sensitive material adhering to and between the fibers of the pile surfaces. In this manner a double faced fastener is attained whereby each face can be adhered to another fastener of this invention. In addition, it is possible to provide pressure-sensitive adhesive in the reservoir adhering to and between the fibers of the pile surface with water and solvent resistant properties so that the fasteners can be washed in water or drycleaned with drycleaning solvents. Many other modifications can be made without departing from the spirit and scope of the appended claims.

What is claimed is:

1. A latent pressure-sensitive sheet material having a discontinuous surface comprising a flocked pile surface adhered to a base material by a permanent adhesive, and a reservoir of a solvent-deposited pressure-sensitive adhesive adhering to and between the fibers forming said flocked pile surface.

2. A latent pressure-sensitive sheet material as claimed in claim 1 wherein said pressure-sensitive adhesive is a synthetic butyl rubber pressure-sensitive adhesive.

3. A latent pressure-sensitive sheet material as claimed in claim 1 wherein the flock forming said flocked pile surface comprises at least one flock selected from the group consisting of acrylic flock, polypropylene flock, cotton flock, polyester flock, nylon flock, viscose rayon flock, and mixtures of any two or more of said flocks.

4. A latent pressure-sensitive sheet material as claimed in claim 1 wherein the fibers forming said flocked pile surface have a thickness of about 2 denier to about 100 denier.

5. A latent pressure-sensitive sheet material as claimed in claim 1 wherein the fibers forming said flocked pile surface have a length of about 0.025 inches to about 0.160 inches.

6. A latent pressure-sensitive sheet material as claimed in claim 1 wherein said permanent adhesive is an aqueous dispersed acrylic adhesive.

7. A pressure-sensitive fastener as claimed in claim 1 wherein said base material is selected from the group consisting of paper, cotton scrim, polyester cotton scrim, polyester-nylon blend fabric, viscose rayon fabric, and plastic film.

8. A system of pressure-sensitive fasteners as claimed in claim 1 comprising first and second flocked pile surfaces adhered to, respectively, first and second base materials by a permanent adhesive, a reservoir of epoxy pressure-sensitive adhesive material adhering to and between the fibers forming said first flocked pile surface, and a reservoir of pressure-sensitive adhesive curing material adhering to and between the fibers forming said second flocked pile surface, said curing material being reactive with said epoxy pressure-sensitive material to form cross-linked structure of both said materials.

9. A pressure-sensitive fastener system as claimed in claim 8 wherein epoxy pressure-sensitive material and said pressure-sensitive curing material are reactive at ambient temperatures over a period of one to 70 hours.

10. A pressure-sensitive fastener system as claimed in claim 8 wherein said epoxy pressure-sensitive adhesive material is a modified Class I epoxy and said pressure-sensitive curing material is a polyamide.

11. A method of fastening two objects together comprising attaching a first pressure-sensitive fastener comprising said first flocked pile surface, said first base material and said reservoir of epoxy pressure-sensitive adhesive material as claimed in claim 8 to one of said objects and attaching a second pressure-sensitive fastener comprising said second flocked pile surface, said second base material and said reservoir of pressure-sensitive adhesive curing material.

12. A method of fastening two objects together comprising attaching one of said first or second pressure-sensitive fasteners as defined in claim 11 to each of said objects and contacting the flocked pile surfaces of said one fastener attached to each of said objects with the flocked pile surface of the other of said pressure-sensitive fasteners as defined in claim 11.

13. A method of fastening two objects together comprising attaching a first pressure-sensitive fastener as claimed in claim 1 to one of said objects and a second pressure-sensitive fastener as claimed in claim 1 to the other of said objects and, contacting the flocked pile surface of said first fastener with the flocked pile surface of said second fastener.

14. A method as claimed in claim 13 wherein one of aid objects is a carpet and the other of said objects is a floor.

15. A method as claimed in claim 13 wherein one of said objects is a carpet and the other of said objects is a floor.

16. A method as claimed in claim 13 wherein one of said objects is the interior of a vehicle roof and the other of said objects is a headliner.

17. A method of fastening two materials together comprising attaching a first pressure-sensitive fastener as claimed in claim 1 to one of said objects and a second pressure-sensitive fastener as claimed in claim 1 to the other of said objects and contacting the flocked pile surfaces of said first and second fasteners with the flocked pile surface of a third pressure-sensitive fastener as claimed in claim 1.

18. A method as claimed in claim 17 wherein said first and second objects are each carpeting.

19. A method for making a latent pressure-sensitive sheet material having a discontinuous surface comprising coating a base material with a permanent adhesive, flocking the permanent adhesive-coated base material with pile fibers and heat-curing the permanent adhesive to secure the pile fibers to the base material, coating the cured flock-coated base material with a solvent-based pressure-sensitive adhesive, and drying the coated cured flock material.

20. A method as claimed in claim 19 wherein said solvent-based pressure-sensitive adhesive is applied to said cured flock-coated base material by means of a gravure roll.

21. A method as claimed in claim 19 wherein the flock forming said flocked pile surface is at least one flock selected from the group consisting of acrylic flock, polypropylene flock, cotton flock, nylon flock, polyester flock, viscose rayon flock, and mixtures of any two or more of said flocks.

22. A method as claimed in claim 19 wherein said solvent-base pressure-sensitive adhesive is a synthetic butyl rubber pressure-sensitive adhesive.

23. A method as claimed in claim 19 wherein said permanent adhesive is an aqueous dispersed acrylic adhesive.

24. A method as claimed in claim 19 wherein said base material is selected from the group consisting of paper, cotton scrim, polyester cotton scrim, polyester-nylon blend fabric, viscose rayon fabric, and plastic film.

25. A method as claimed in claim 19 wherein the fibers forming said flocked pile surface have a length of about 0.025 inches to about 0.040 inches.

26. A method as claimed in claim 19 wherein the fibers forming said flocked pile surface have a thickness of about 2 denier to about 100 denier.

27. Method as claimed in claim 19 wherein said solvent-based pressure-sensitive adhesive is an epoxy pressure-sensitive adhesive material.

28. Method as claimed in claim 27 wherein said epoxy pressure-sensitive adhesive material is a modified Class I epoxy.

29. Method as claimed in claim 19 wherein said solvent-based pressure-sensitive adhesive is a pressure-sensitive adhesive curing material reactive with an epoxy pressure-sensitive adhesive material.

30. Method as claimed in claim 29 wherein said pressure-sensitive adhesive curing material is a polyamide reactive with a modified Class I epoxy.

* * * * *